(12) United States Patent
Kupietz

(10) Patent No.: US 6,435,613 B1
(45) Date of Patent: Aug. 20, 2002

(54) PART OF A MOTOR VEHICLE SEAT

(75) Inventor: Sascha Kupietz, Herford (DE)

(73) Assignee: Bertrand Faure Sitztechnik GmbH & Co. KG, Stadthagen (DE)

(*) Notice: Subject to any disclaimer, the term of this patent is extended or adjusted under 35 U.S.C. 154(b) by 0 days.

(21) Appl. No.: 09/566,809

(22) Filed: May 8, 2000

(30) Foreign Application Priority Data

May 29, 1999 (DE) .................................. 299 09 441 U

(51) Int. Cl.⁷ .................................................. A47C 1/02
(52) U.S. Cl. ................................... 297/338; 297/344.15
(58) Field of Search .............................. 297/338, 311, 297/344.12, 344.13, 344.15, 344.17

(56) References Cited

U.S. PATENT DOCUMENTS

| | | | | |
|---|---|---|---|---|
| 4,470,632 A | * | 9/1984 | Babbs | 297/344.13 X |
| 5,709,364 A | * | 1/1998 | Araki et al. | 297/344.17 X |
| 5,806,824 A | * | 9/1998 | Isumura et al. | 297/344.17 X |
| 6,264,275 B1 | * | 7/2001 | Frohnhaus et al. | 297/344.15 X |
| 6,290,198 B1 | * | 9/2001 | Kojima et al. | 297/344.15 X |

FOREIGN PATENT DOCUMENTS

DE  298 14 449  1/1999

* cited by examiner

Primary Examiner—Peter M. Cuomo
Assistant Examiner—Stephen Vu
(74) Attorney, Agent, or Firm—Connolly Bove Lodge & Hutz LLP

(57) ABSTRACT

A motor vehicle seat part having a seat part frame whose rearward height is adjustable by pivotable steering devices is provided.

7 Claims, 4 Drawing Sheets

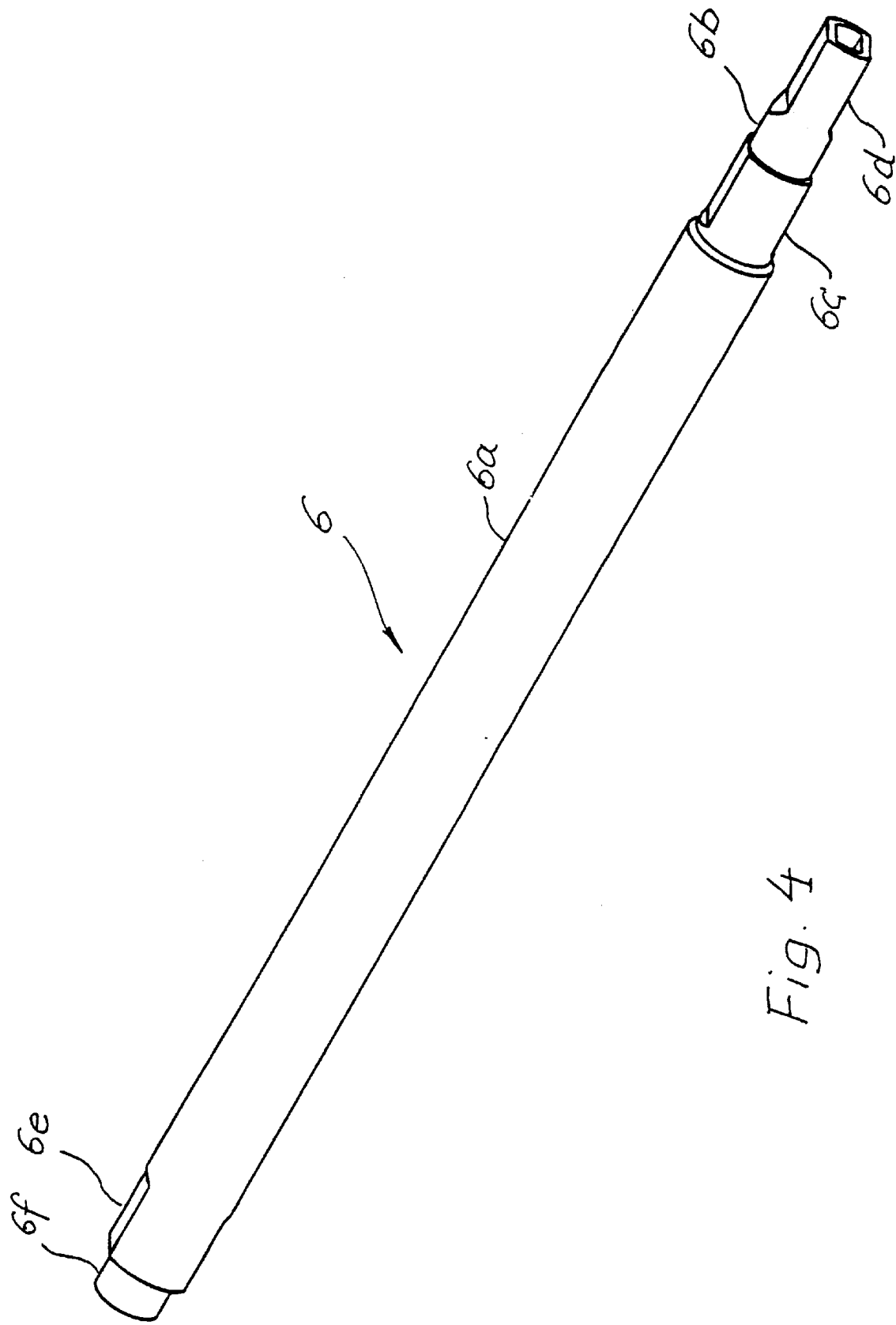

PART OF A MOTOR VEHICLE SEAT

FIELD OF THE INVENTION

This invention pertains to a part of a motor vehicle seat having a seat part frame whose rearward is adjustable by means of pivotable steering devices.

BACKGROUND OF THE INVENTION

In the case of a seat part whose height and inclination may be adjusted by means of steering devices (DE 298 14 449 U1), it is already known how to connect with one another, by means of a connecting tube that runs in a transverse manner, steering devices and adjustment elements that are provided at various sides of the seat part and are to be activated in concert with one another. The steering devices and adjustment elements surround and grip the tube with round openings and are welded to the tube. To save weight, the connecting tubes are thin-walled and have small diameters. The connection sites between the steering devices and the adjustment elements and the tube are under great stress, particularly in the event of a crash. In order to be able to adsorb the stresses with certainty, the forces must be removed by means of clean spot welds or seam welds, the qualitatively high value of which is difficult to realize.

SUMMARY OF THE INVENTION

It is a purpose of the invention to create a cost-effective, yet secure connection that is proof against rotation, between the steering devices and adjustment elements that are to be activated in concert, which is the same time of a favorable weight.

The task is accomplished by a motor vehicle seat part comprising a seat part frame; first and second pivotable steering devices pivotally seated on the frame of said seat part, said steering devices positioned adjacent the frame of said seat part opposite one another; a round horizontal connecting tube comprising a central area and a first and second end; said first end comprising an inner flattened area, an outer round bearing area, and an outer flattened area, wherein the round diameter of said inner flattened area is greater than the round diameter of said outer flattened area; said connecting tube attached to said steering devices therebetween to therein couple said steering devices so as to be non-rotatable; a propulsion segment comprising an acceptance area, said propulsion segment fixed on said inner flattened area of said first end via said acceptance area so as to be non-rotatable, said first steering device fixed on said outer flattened area of said first end; a bearing flange including an acceptance area fixed to said seat part frame, said bearing flange positioned on said on said outer round bearing area of said first end via said acceptance area to therein be capable of rotation; wherein the height of the rearward end of said seat frame may be adjusted by said pivotable steering devices.

As a result of the form fit between the connection tube and the steering devices, or rather, propulsion segment, a connection that is proof against rotation arises, which can be produced in a cost-effective and error-free manner. The central area of the connection tube, which is arranged between the opposite sides of the frame of the seat part, can be embodied with a diameter that renders the frame of the seat sufficiently rigid. In the process, the bearing and reinforcement points, as well as the steering devices and propulsion segments, must be embodied in any larger or heavier fashion than heretofore.

Preferred embodiments of the invention result from the dependent claims.

BRIEF DESCRIPTION OF THE DRAWINGS

One preferred embodiment of the invention is described in detail below with the reference to the drawings, wherein:

FIG. 4 shows a perspective view of the connecting tube according to FIG. 2, depicted in isolation.

DETAILED DESCRIPTION OF THE PREFERRED EMBODIMENT

Figure 1:
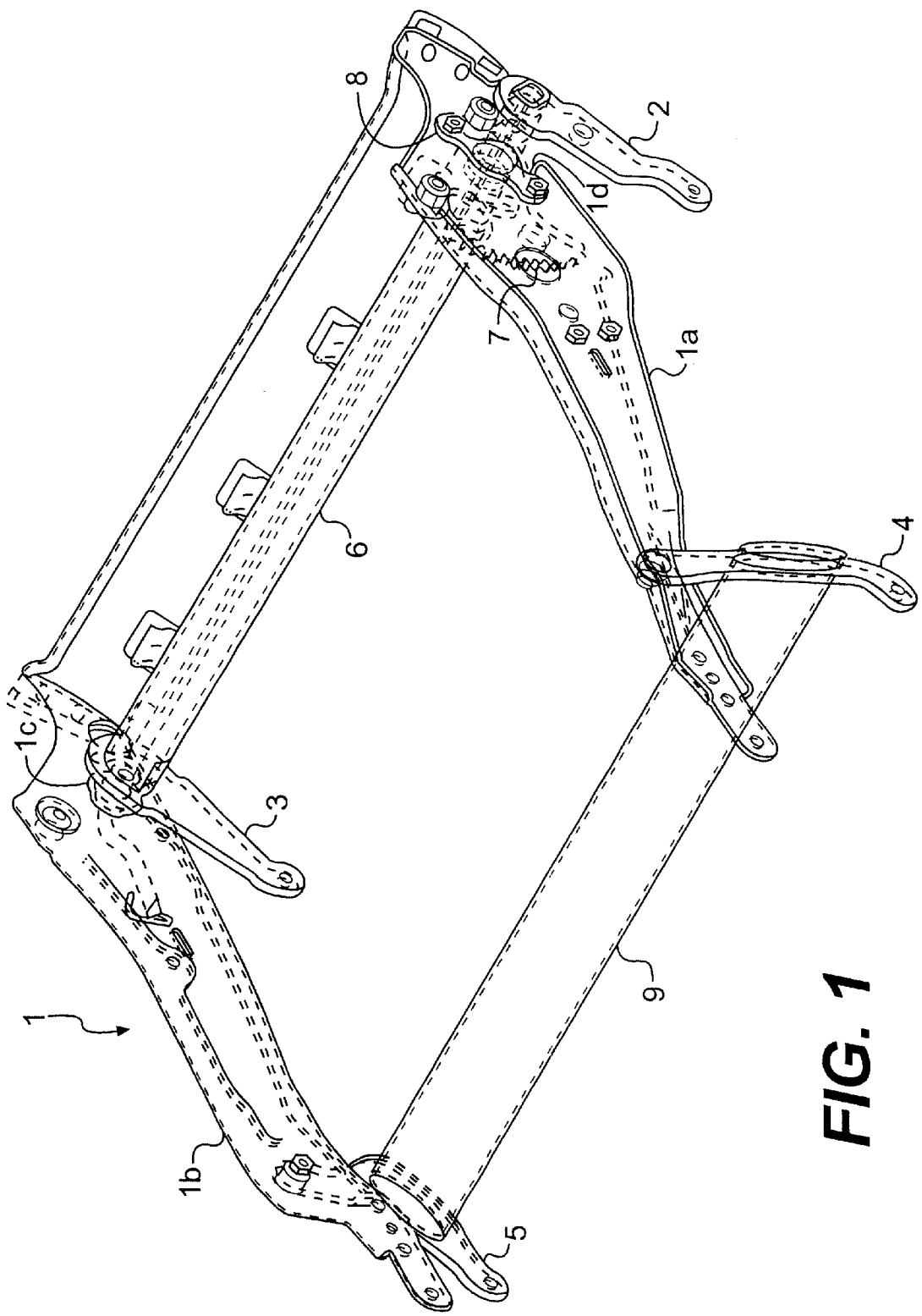
FIG. 1 shows a perspective view of the frame of a seat portion with anterior and posterior pairs of steering devices can pivot for the purpose of adjusting the height or inclination of the seat.

A seat frame 1 of a motor vehicle seat part, which is depicted in FIG. 1 in an un-upholstered state, exhibits two capping pieces on the longitudinal sides 1a and 1b to which, in each case, an anterior steering device 4 and 5 and posterior steering device 2 and 3 are attached in a pivotable manner. The anterior steering devices 4 and 5 are connected with one another in a rigid fashion by means of a smooth connecting tube 9. The posterior steering devices 2 and 3 are coupled to one another in a non-rotational way, by means of a connecting tube 6 to which, on one side, a propulsion segment 7 is attached.

The connecting tube 6 is seated as to be rotatable in the right longitudinal side capping piece 1b, viewed in the direction of travel. On the left longitudinal side capping piece 1a, the connecting tube 6 is seated in a bearing flange 8 which covers a recess 1d in longitudinal side capping piece 1a and is screwed together with the latter.

Figure 2:
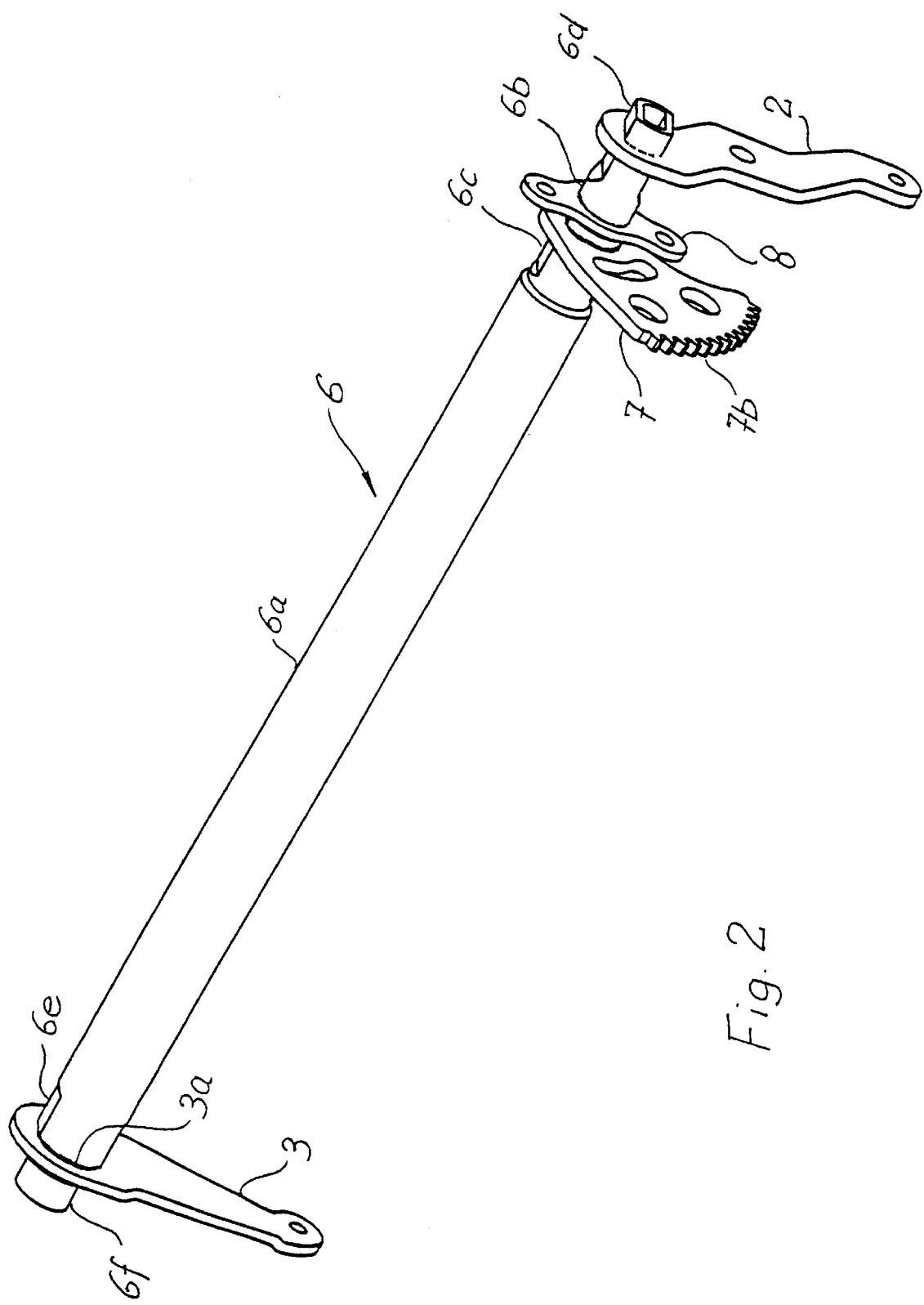
FIG. 2 shows a perspective view of the connecting tube; with the positioning elements, which are fixed so as to resist rotation, and bearing flange.

The connecting tube 6 with its bearing area 6f is seated in the bearing bore-hole 1c, as shown in FIG. 2. The steering device 3, which is adjacent to the right longitudinal side capping piece 1b, is pressed, so as to be form-fitting, onto an area 6e that includes a flattened surface, and is fixed to prevent shifting in the axial direction. In addition, the steering device 3 includes a correspondingly shaped acceptance opening 3a. The remaining portion of the opening 3a has a round cross-section, having the same diameter as a central tube area 6a, which extends from steering device 3 to approximately as far as the propulsion segment 7.

Figure 3:
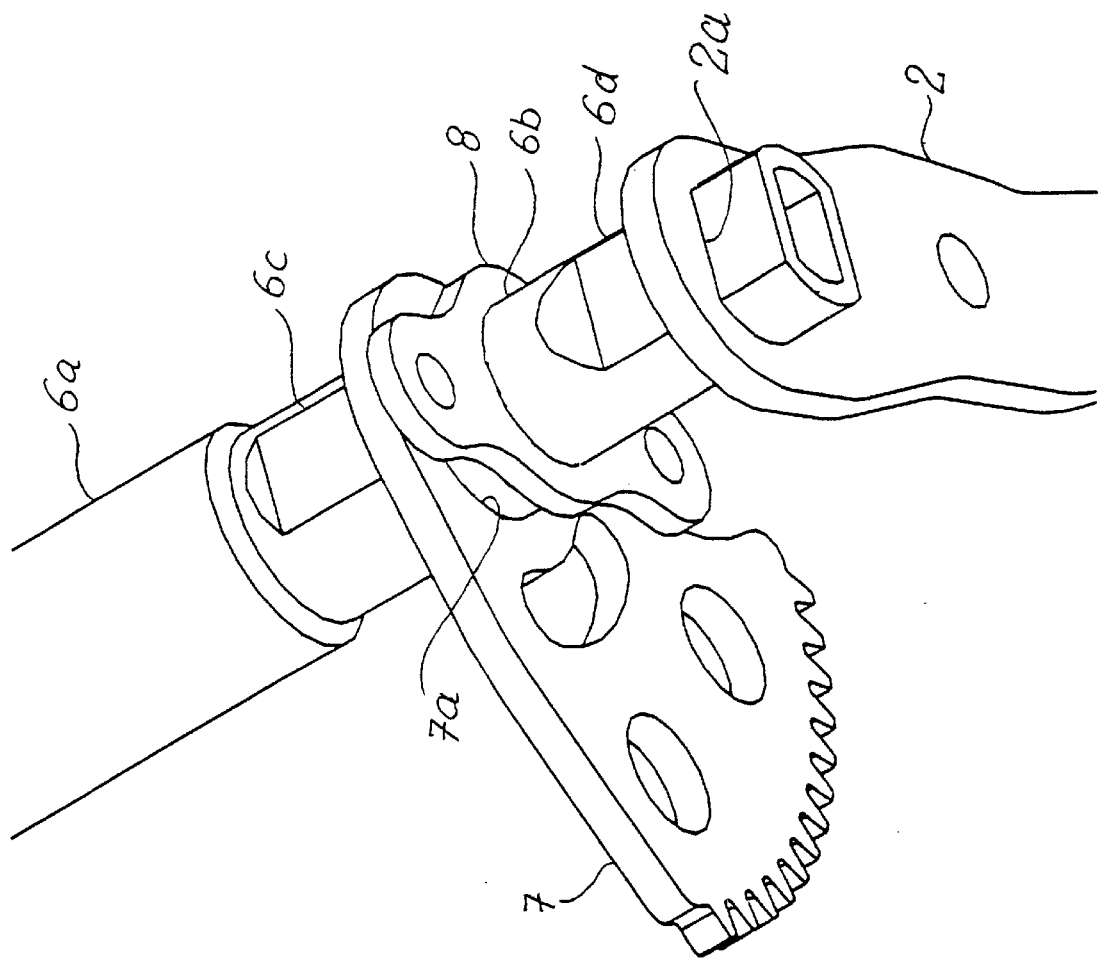
FIG. 3 shows an enlarged view, in perspective, of the right tube area, according to FIG. 2, with elements that are attached to it.

The propulsion segment 7, which is equipped with gear toothing 7b, includes an acceptance opening 7a through which is inserted an inner flattened area 6c of the connecting tube 6, as shown in FIG. 3. The outer round diameter of the inner flattened area 6c is reduced, compared to the diameter of the central area 6a. An outer ground bearing area 6b, by means of which the connecting tube 6 is seated in the bearing flange 8 so as to be capable to rotation, is a continuation of the inner flattened area 6c. The outer bearing area 6b includes a decreased diameter as compared to the outer round diameter of the inner flattened area 6c. The difference in diameters between the areas 6c and 6b results in a shoulder that limits any shifting of connecting tube 6 in the direction of the axis as a result of abutting against the bearing flange 8. An outer flattened area 6d, onto which the acceptance opening 2a of steering device 2 is pushed so as to prevent rotation, is a continuation of the outer round bearing area 6*b*. The inner round diameter of this outer flattened area 6*d* corresponds to the diameter of the outer round bearing area 6*b*. As can be seen from FIG. 4, in each case, two flattened surfaces that lie opposite one another, are provided for each flattened area 6*e,* 6*c,* and 6*d,* so that surfaces for wrenches arise that assure the connection, in a non-rotatable manner, of the steering devices 2 and 3 and propulsion segment 7 with the connecting tube 6, even under high stresses. The points of connection of the connection tube with the repositioning elements and the bearing points, can be produced, in their entirety, by re-shaping. The inner and outer flattened areas each include a round diameter as defined between the round portions and a flattened diameter as defined between the flattened areas.

What is claimed is:

1. A motor vehicle seat part comprising:

a seat part frame comprising a rearward end;

first and second pivotable steering devices pivotally seated on said seat part frame, said steering devices positioned adjacent said seat part frame opposite one another;

a round horizontal connecting tube comprising a central area and a first and second end;

said first end comprising an inner flattened area, an outer round bearing area, and an outer flattened area, wherein a round diameter of said inner flattened area is greater than a round diameter of said outer flattened area;

said connecting tube attached to said steering devices therebetween to therein couple said steering devices so as to be non-rotatable;

a propulsion segment comprising an acceptance area, said propulsion segment fixed on said inner flattened area of said first end via said acceptance area so as to be non-rotatable, said first steering device fixed on said outer flattened area of said first end;

a bearing flange including an acceptance area fixed to said seat part frame, said bearing flange positioned on said on said outer round bearing area of said first end via said acceptance area to therein be capable of rotation;

wherein the height of said rearward end of said seat part frame may be adjusted by said pivotable steering devices.

2. The motor vehicle seat part according to claim 1, wherein the inner round diameter of the outer flattened area is equal to the diameter of the outer round bearing area.

3. The motor vehicle seat part according to claim 1, wherein the outer round diameter of the inner flattened area is smaller than the diameter of the central area of said connecting tube.

4. The motor vehicle seat part according to claim 1, wherein the outer flattened area and the inner flattened area of the first end each comprise two parallel wrench engaging surfaces connected by round areas.

5. The motor vehicle seat part according to claim 1, wherein the second end of the connecting tube comprises an inner flattened area onto which a suitable acceptance opening of a second steering unit may be pushed, and an outer round bearing area.

6. The motor vehicle seat part according to claim 5, wherein the diameter of the outer round bearing area of the second end is smaller than the diameter of the central area of said connecting tube.

7. The motor vehicle seat part according to claim 5, wherein the inner flattened area of the second end comprises two parallel wrench engaging surfaces connected by round areas.

* * * * *